July 17, 1934.  B. R. PLANCHE  1,966,804
AUTOMATIC STARTING RHEOSTAT FOR ELECTRIC MOTORS
Filed Dec. 6, 1932   3 Sheets-Sheet 1

Inventor
BENJAMIN RENÉ PLANCHE
BY Haseltine, Lake & Co.
ATTORNEYS

July 17, 1934.  B. R. PLANCHE  1,966,804
AUTOMATIC STARTING RHEOSTAT FOR ELECTRIC MOTORS
Filed Dec. 6, 1932  3 Sheets-Sheet 2

Inventor
BENJAMIN RENÉ PLANCHE
BY Haseltine, Lake & Co.
ATTORNEYS

July 17, 1934.  B. R. PLANCHE  1,966,804
AUTOMATIC STARTING RHEOSTAT FOR ELECTRIC MOTORS
Filed Dec. 6, 1932  3 Sheets-Sheet 3

INVENTOR
BENJAMIN RENÉ PLANCHE
BY Haseltine, Lake & Co.
ATTORNEYS

Patented July 17, 1934

1,966,804

UNITED STATES PATENT OFFICE 1,966,804

AUTOMATIC STARTING RHEOSTAT FOR ELECTRIC MOTORS

Benjamin René Planche, Villefranche-sur-Saone, France

Application December 6, 1932, Serial No. 645,875
In France March 11, 1932

5 Claims. (Cl. 172—289)

The present invention relates to improvements in automatic starting rheostats for electric motors, notably of the type described in the specification of Letters Patent No. 1,885,373 in which the electrodes are fixed, whereas the liquid, under the action of the rotation of the electric motor to be started, and by means of a small vane type of pump, automatically rises in the apparatus, in order to progressively submerge the said fixed electrodes, so as to decrease the resistance thereof and finally produce their short-circuiting by the interposition of a flexible membrane.

The improvements of the present invention are for the purpose of simplifying the construction of this kind of apparatus, whilst rendering its manipulation easier and its operation more certain.

The invention is illustrated by way of example in the accompanying drawings in which.

Throughout the views, the same indicia refer to the same or like parts.

Figure 1:
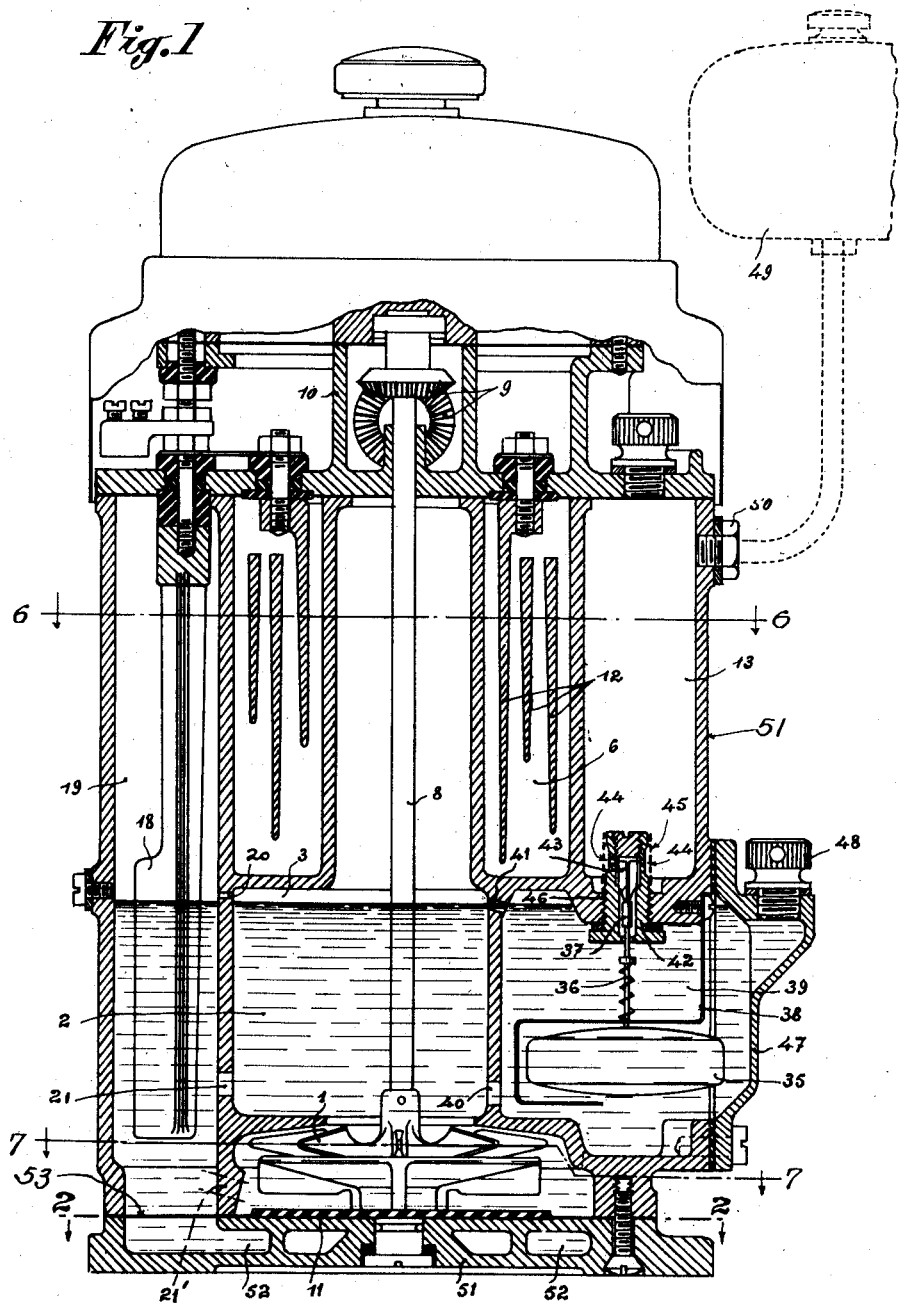
Figure 1 is a vertical sectional elevation of an apparatus made according to the invention and embodying the features thereof in practical form.

According to the invention the rotor 1, upon being revolved draws the liquid 2 from a compartment 3, pumps or forces it by the action of centrifugal force through port 4 and passage 5 into a compartment 6 containing the electrodes 12. The rotor 1 is arranged to rotate in a horizontal plane, so that its driving shaft 8 is vertical and issues from the apparatus above the level of the electrolyte, which eliminates the necessity of a stuffing-box.

The rotor shaft 8 is directly driven by the electric motor to be started by means of bevel pinions 9 arranged inside an airtight casing 10 which allows of proper lubrication of the various driving members and at the same time protects them from the vapors of the electrolyte. These vapors can thus be corrosive without affecting the satisfactory working of the apparatus.

The apparatus is provided with a retaining valve 11 intended to retard the liquid at the moment that the rotor is set in action and to facilitate its descent, on the contrary, at the stoppage. This valve 11 is circular and being arranged at the base of the apparatus, its own weight tends to make it automatically close.

The electrodes 12 which before starting, are not immersed in the electrolyte, and which are connected to the terminals of the motor, are circular to conform to the shape of the compartment 6 in which they are placed.

For starting, the apparatus includes three separate electrodes 18, for the first starting terminal which are electrically connected to the other electrodes 12 and serve to produce the breaking of the electric circuit in case that, for any reason, the motor does not start.

In that case, the current, being left on, the liquid contained in compartment 19 will be heated and, at the end of a certain time, will vaporize. The amount of vapour thus produced is such that it cannot, wholly, escape through a small port 20. A certain pressure is then produced which forces the liquid back through a port 21 into the compartment 3. These electrodes 18 are thus no longer, or almost no longer submerged so that the motor is practically cut out.

The port 21 instead of being in the suction zone of the rotor, could be arranged, as shown in broken lines (Fig. 1) in the zone of discharge, which has the following advantages:

(a) Of causing the electrolyte to have a tendency to rise in the compartment 19 as soon as the rotor starts, thus facilitating the acceleration of the motor, whereas if, on the contrary, the orifice 21 is in communication with the suction zone of the rotor, the level of the liquid in said compartment 19 has a tendency to sink, as it sinks in the compartment 3, involving a slowing-up of the motor by the increase of resistance which results from this lowering of the level;

(b) Of creating a constant liquid circuit between the compartments 19 and 3, by means of the ports 21 and 20, which liquid circuit has the advantage of very quickly restoring the electrolyte to the same temperature in the various compartments.

Consequently the current strength is stabilized at a relatively low point without the electrodes being completely freed from the electrolyte, and in consequence eliminating sparking and sudden variation of the current which might arise for example, by the violent ebullition of the electrolyte.

Further the electrodes remaining immersed with a very feeble conveyance of current have the advantage of causing the voltage of the coil to drop to a sufficient extent to prevent electric arcs between the electrodes.

Figure 6:
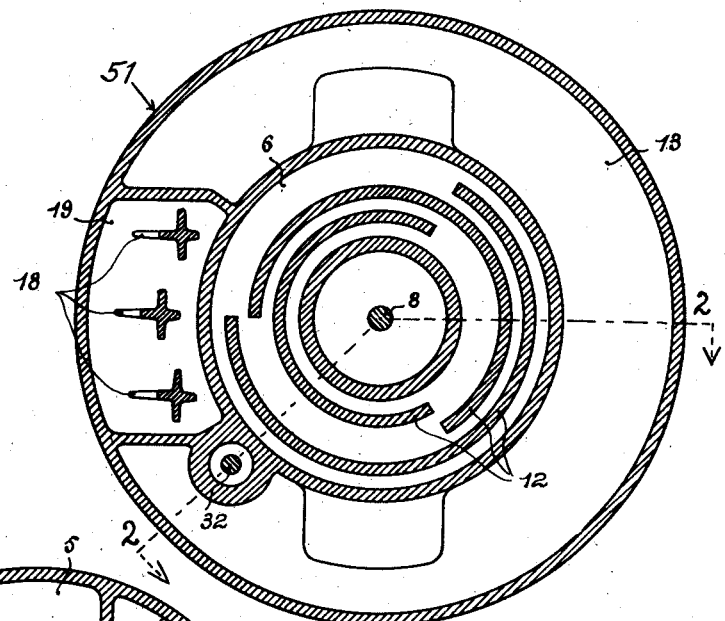
Figure 6 is a transverse section of the apparatus embodying the invention taken on line 6—6 of Figure 1.
Figure 7:
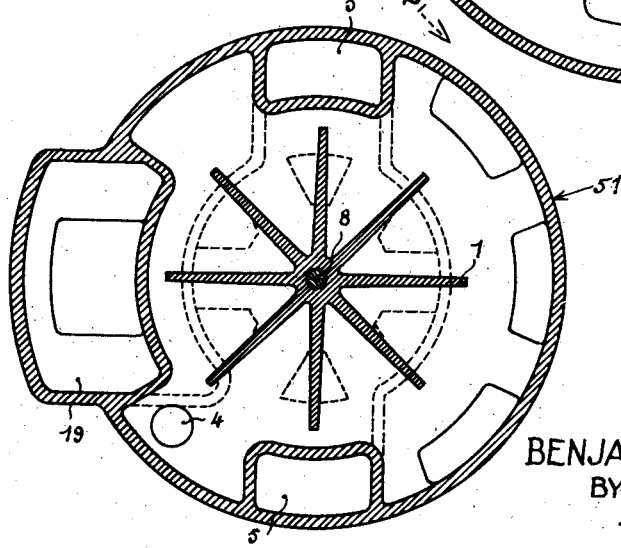
Figure 7 is another section taken approximately on line 7—7.

Finally, owing to this arrangement, the density curve of the flow of current of a motor during its first phase, which, for any reason, would not start, is approximately in conformity with the curve illustrated in Figure 6.

At the moment of throwing into gear, the flow of current attains the value A, assigned by the actual quantity present of the electrolyte, then, owing to the heating of the electrolyte, the resistance decreasing, this flow of current gradually increases up to B, but if, at this moment the motor still refuses to start, the heating produces evaporation of the electrolyte and forces back the liquid from between electrodes, whence gradual decrease of the current density occurs down to C.

At this moment the current strength sinks to the point at which the electric resistance is such that the production of heat which results therefrom ($R\,I^2$) is equal to the radiation of heat by the rheostat, and matters remain in that state until the liquir completely evaporates or the current is cut off.

Figure 3:
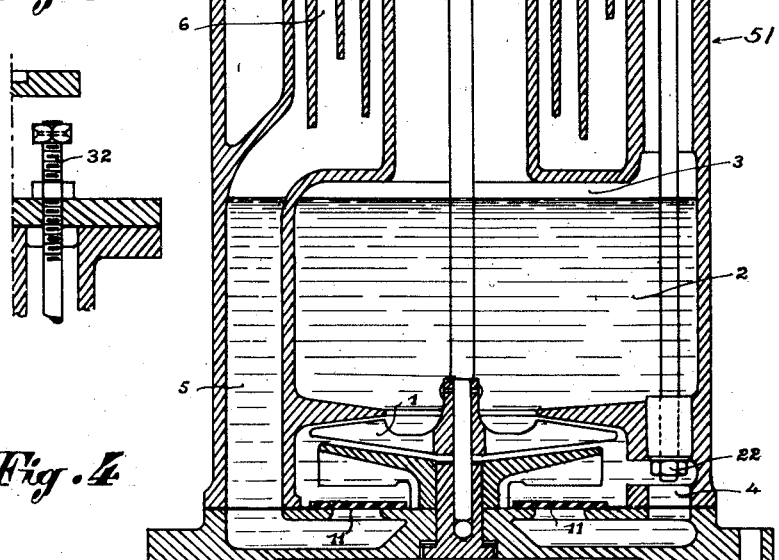
Fig. 3 is a detail view partially showing the means for regulating the flow of the electrolyte.
Figure 4:
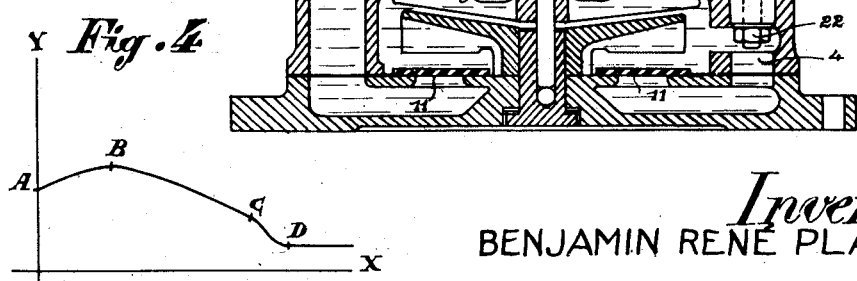
Fig. 4 is a diagram showing the curve of intensity of the flow of current of a motor during its first phase, in case it should not start.
Figure 5:
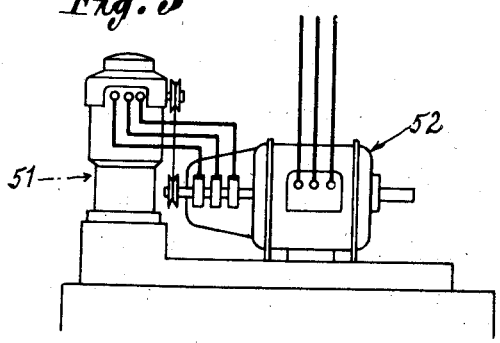
Figure 5 illustrates an application of the invention to a motor intended to be controlled thereby.

Means are provided for adjusting the delivery of the rotor 1 for the purpose of regulating the speed of ascent of the liquid, said means comprising a member 22 which has its driving gear 32 (Fig. 3) situated above the upper level of the electrolyte, so that its proper working cannot be affected by the deposit of the salts of the electrolyte, which might injure the screw-threads thereof.

Figure 2:
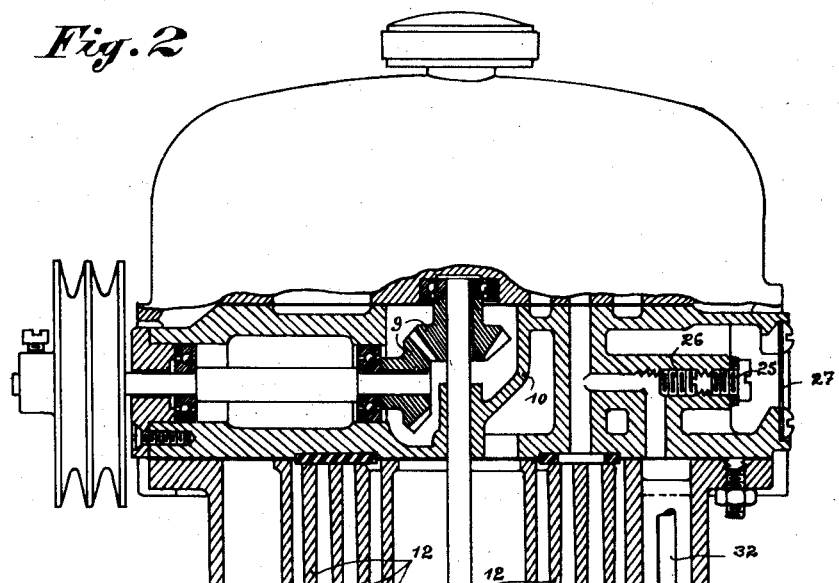
Figure 2 is another sectional elevation taken from a different position, on line 2—2 of Figure 6.

The rheostat is placed in communication with the atmosphere by a port 25 (Fig. 2) which opens into a passage outside the cover so that if the electrolyte produces vapors, these are not deposited on the different members of the rheostat, to produce therein rust or any chemical erosion.

Air return ports are regulatable by means of a screw 26 arranged behind a grating 27. This air return port is designedly difficult of access, so that, when once regulated it cannot be interfered with.

A reserve liquid compartment 13, arranged round the compartment 6 containing the circular electrode 12, feeds the lower compartment 3 of the rheostat by means of a float 35 the rod 36 of which operates a small valve 37.

Thus, when the rheostat operates and the liquid level in the lower compartment 3 falls, if this level is sufficiently low for the float 35 to be no longer kept raised, it slightly descends, liberates the valve 37 and allows the reserve electrolyte liquid to flow in order to fill up the deficiency.

The float 35 guided by a flat iron member 38 is arranged in a compartment 39 separate from the compartment 3, which compartment 39 is simply in communication with the compartment 3 through two ports, a lower one 40, and an upper one 41.

This separation is for the purpose of preventing the eddies produced by the operation of the rotor 1 from affecting the float which is in still liquid, and is thus not subjected to the influence of the variations of level.

The upper port 41 serves for the gaseous discharges, whilst the lower port 40 allows of the displacements of the liquid.

The seat of the valve 37 is composed of a metal stopper 42 inside which is fitted a seat 43.

The stopper 42 is provided with two small ports 44 which are protected by a fine grating 45 which exteriorly surrounds them.

Under the lower portion of the seat 43 is the valve of rubber or cork 37. This is kept supported by the float 35 against the outflow port 46 which is thus obstructed when the float is raised, or liberated, when the float sinks, in the latter case, the liquid flows out around the valve through the orifice of the float stem 36 and enters the lower chamber.

It is to be noted by this arrangement, the reserve electrolyte is firstly filtered through the upper grating 45, then decanted between the members 42 and 43 and finally flows away through the port 46.

It is also to be remarked that evaporation being very slow, the amount of liquid which is to flow through these various ports is very insignificant, so that it is only necessary to provide very small ports.

The whole of this arrangement, including the stopper 42 can be assembled or taken to pieces without having to touch the rest of the rheostat. It suffices to remove a cover 47 which is simply held to the main casing by exterior screws. A plug 48 is provided for filling the rheostat.

The arrangement of maintenance of the level has the advantage of not being subjected to the influence of the variations of temperature of the rheostat.

It has besides, the further advantage of being able to supply any amount of reserve electrolyte from a single tank 49 arranged in communication with the compartment 13 by means of a connection 50.

The tank 49 may have a capacity of 20, 30, 50 litres or more, without any inconvenience, thus allowing continuous working of the rheostat for several years, without further attention.

What I claim as my invention and desire to protect by Letters Patent is:

1. In combination, an electric motor, a source of power, and means for starting the motor including a casing having an electrolyte container with electrolyte therein, a plurality of chambers adjacent to said container in said casing, a plurality of electrodes mounted in one of said chambers, and a pump driven by the motor to be started located in a compartment adjacent to said container and communicating with both said container and electrode containing chamber, the pump during operation drawing electrolyte from the container and forcing the same into the electrode containing chamber in order to progressively immerse the electrodes, in combination with at least one separate auxiliary electrode mounted in another of said chambers, which auxiliary electrode is connected to aforesaid electrodes and adapted for use in the first phase of the starting and effective to cause interruption of the starting current in case the motor fails to start, by heating up and evaporating the electrolyte in the chamber containing said auxiliary electrode.

2. An automatic starting rheostat adapted to regulate and gradually increase an electric current in controlled manner, comprising a casing having an electrolyte container with electrolyte therein, a plurality of chambers adjacent to said container in said casing, a plurality of electrodes mounted in one of said chambers, and a driven pump located in a compartment adjacent to said container and communicating with both said container and electrode containing chamber, the pump during operation drawing electrolyte from the container and forcing the same into the electrode containing chamber in order to progressively immerse the electrodes, in combination with at least one separate auxiliary electrode mounted in another of said chambers, which auxiliary electrode is connected to aforesaid electrodes and adapted for use in the first phase of controlling the initial current and effective to cause interruption of the current in case the same fails to encounter sufficient external resistance and therefore becomes excessive, by heating up and evaporating at least part of the electrolyte in the chamber containing said auxiliary electrode so as to cause depression of the surface of the electrolyte in said last chamber from the resulting vapor pressure generated therein by such heating and evaporation.

3. The combination according to claim 1, wherein the pump includes a centrifugal rotor having a vertical shaft and during rotation forces electrolyte centrifugally outward from the pump chamber, and wherein evaporation of the electrolyte in the auxiliary electrode chamber is caused by the heating up of the latter, the vapor resulting from such evaporation driving by expansion the electrolyte downward out of contact with the auxiliary electrodes and from said chamber into the container and other chambers in the casing.

4. The combination according to claim 1, wherein the pump includes a centrifugal rotor having a vertical shaft, an enclosed gear housing forming a cover for the casing of the rheostat and simultaneously protecting gearing contained therein from any contact with electrolyte or fumes in said casing, the vertical pump shaft extending up into said housing and through said gearing obtaining the drive from the motor.

5. The combination according to claim 1, wherein the pump includes a centrifugal rotor having a vertical shaft, an enclosed gear housing surmounting the rheostat casing above the pump shaft and containing gearing and protecting the same from any contact with electrolyte or fumes in said casing, the vertical pump shaft extending up into said housing and through said gearing obtaining the drive from the motor.

BENJAMIN RENÉ PLANCHE.